Patented Jan. 11, 1949

2,458,688

UNITED STATES PATENT OFFICE 2,458,688

WELDING CUPRO-NICKEL ALLOYS

Charles H. Davis, Cheshire, Conn., assignor to The American Brass Company, Waterbury, Conn., a corporation of Connecticut No Drawing. Application May 16, 1945, Serial No. 594,157

3 Claims. (Cl. 113—112)

This invention relates to the welding of cupro-nickel alloys, and has for its object the provision of certain improvements in the welding of such alloys. A further object of the invention is the provision of a novel cupro-nickel or copper-nickel base alloy of the composition required for practicing the method of the invention.

The fabrication of tubes, tanks and other types of closed or partially closed metallic vessels by welding is of great commercial importance, not only because of the moderate cost of the welding operation, but because welding makes possible the fabrication of vessels of irregular shapes. Cupro-nickel alloys are widely used in making such vessels and other articles where corrosion resistance is required. Parts fabricated of cupro-nickel alloys have heretofore been welded (1) by means of an electric arc employing a filler or welding rod coated with a special flux, or (2) by means of a gas flame (such as an oxy-acetylene torch) and a filler rod of a special composition containing silicon, in the presence of a suitable flux. In no instance has it heretofore been possible to make a strong and sound weld free from porosity between parts made of cupro-nickel alloys without the use of a suitable flux or a flux-coated filler rod.

I have discovered that the inclusion of a small amount of magnesium in cupro-nickel-alloys enables the welding of parts made thereof without the use of any flux. The present invention, based on that discovery, involves fabrication of the parts to be welded of a cupro-nickel or copper-nickel base alloy containing 0.02 to 0.1% magnesium, and heating those parts in welding position approximate the zone of the contemplated weld to the welding temperature in the absence of any flux and in the presence of a filler made of a cupro-nickel alloy also containing 0.02 to 0.1% magnesium. Preferably, the parts to be welded and the filler are made of substantially the same magnesium-bearing cupro-nickel base alloy. The cupro-nickel alloy may be of any type such for example as the widely used 70 (copper)—30 (nickel) type, the less commonly used 80—20 type, and even the 90—10 type, and entirely satisfactory practical results are obtained with a magnesium content of 0.03 to 0.05%. A further aspect of the invention resides in the novel copper-nickel base alloy required for the practice of the improved welding method and containing from 10 to 35% nickel (preferably from about 15% to about 33%), from 0.02 to 0.1% magnesium, and the balance copper save for small amounts of elements commonly included in cupro-nickel alloys. The magnesium content of the alloy may advantageously be 0.03 to 0.05.%

Magnesium in very small amounts has heretofore been used as a scavenging or fluxing agent in compounding and melting cupro-nickel alloys. The sole purpose of such use of magnesium is to secure a clean and sound alloy free from dross and with a high degree of ductility. The amount of magnesium employed in these prior practices is so small as to leave a residual amount of magnesium in the resulting alloy of not more than about 0.01%. This small amount of residual magnesium in the resulting alloy serves solely as an assurance that an adequate amount of magnesium has been used for the contemplated purposes of scavenging or fluxing, and its presence imparts no known advantageous physical properties to the alloy. My present invention is based on the discovery that the deliberate inclusion of a predetermined amount of magnesium in cupro-nickel alloys permits the welding of parts made thereof in the presence of a filler made of a cupro-nickel alloy similarly containing magnesium without the need of any flux, either as a coating on the filler rod or as an accessory.

With the inclusion of magnesium in the cupro-nickel alloy of which the parts to be welded are made and with a filler (either in the form of a rod or otherwise) of the same or similar magnesium-bearing cupro-nickel alloy, the welding is otherwise carried out in the conventional manner, but without any flux. For example, in electric arc welding the welding rod is made of the magnesium-bearing cupro-nickel alloy without any flux coating, and the parts to be welded are made of the magnesium-bearing cupro-nickel alloy. Welding of the magnesium-bearing cupro-nickel alloy parts may advantageously be carried out by an oxy-acetylene torch or flame, slightly reducing in character, with a filler of the magnesium-bearing cupro-nickel alloy in the absence of any flux. The ability to weld by means of the gas flame is of special importance where electric energy is not available. Where magnesium-bearing cupro-nickel alloy sheets or plates are welded in the presence of a filler of the same or similar magnesium-bearing alloy without any flux, a strong and sound weld free from porosity is readily obtained. The presence of magnesium in the amount contemplated by the invention further improves the weldability of the cupro-nickel alloy by causing the metal (e. g. from the welding rod) to melt off quietly and in large drops. The molten metal appears to be encased in a protecting film. With the same welding procedure on parts made of similar cupro-nickel alloy but not containing magnesium, the metal melts off in a highly agitated spray of small droplets when no flux is used, and the resulting welds are weak and distinctly porous. A comparison of the welds obtained (1) by the practice of the invention and (2) by the same welding procedure on parts made of a similar cupro-nickel alloy without magnesium showed a tensile strength of 48,300 pounds per square inch for the weld of the invention and a tensile strength of 18,000 pounds per square inch for the other weld.

While the invention is of special advantage in welding parts fabricated of the 70—30 cupronickel alloy (i. e. containing 29 to 33% nickel), it is equally of advantage in welding parts fabricated of the 80—20 cupro-nickel alloy (i. e. containing 19 to 23% nickel), and generally may be practiced with any cupro-nickel alloy containing from 10 to 35% nickel. Cupro-nickel alloys commonly contain a small amount of manganese, from an appreciable amount (say 0.02%) up to about 1%, and sometimes as high as 1.5%. Manganese is usually added to these alloys as a deoxidizer and desulphurizer. These alloys also commonly contain iron from an appreciable amount (say 0.05%) up to about 0.75%, and sometimes as high as 2%, where resistance to hot impingement corrosion is required. Cupro-nickel alloys further commonly contain fractional percentages of other elements, usually as impurities, such as silicon, tin, zinc, phosphorus etc. Any or all of these other elements may similarly be included in the characteristic cupro-nickel alloys of the invention.

The novel magnesium-bearing cupro-nickel alloys of the invention may contain manganese and iron within the ranges hereinabove mentioned without any appreciable effect upon the efficacy of the magnesium for the purposes of the invention. The presence of silicon in the magnesium-bearing cupro-nickel alloys of the invention up to a significant amount, for instance 0.1%, has no apparent harmful effect. On the other hand, the presence of silicon is not necessary or advantageous to assist or supplement the making of a strong and sound weld with the magnesium-bearing cupro-nickel alloys. The magnesium-bearing cupro-nickel alloys of the invention may also contain the fractional percentages of impurities commonly found in commercial cupro-nickel alloys.

The magnesium-bearing cupro-nickel alloy of the invention cannot be successfully used without flux for the filler rod in oxy-acetylene welding of magnesium-free cupro-nickel alloy plates or the like. In other words, for successful welding without flux in accordance with the invention, both of the parts to be welded and the filler must be made of the magnesium-bearing cupronickel alloy. While the parts to be welded and the filled need not be made of magnesium-bearing cupro-nickel alloys of the same composition, it is preferable and generally advantageous to make the parts to be welded and the filler of substantially the same alloy. On the other hand, it has been demonstrated that there is an improvement in the weldability even where one or more of the elements in the weld assembly is not magnesium-bearing, but in such a case the use of a certain amount of flux is necessary. Thus, while the optimum advantages of the invention are realized when all of the elements of the weld assembly are made of a magnesium-bearing cupro-nickel alloy, it has been found that the inclusion of magnesium in only the cupro-nickel alloy of the filler or of only one of the parts to be welded results in an improvement in weldability. For example, such an improvement is obtained by the inclusion of magnesium in the cupro-nickel alloy of one part to be welded to a part of another metal or alloy.

The invention is of special advantage in welding one length of tube to another, the tubes being fabricated of the magnesium-bearing cupro-nickel alloy. The improved method of welding may be employed in butt-welding to join tubes, sheets, plates and the like, in seam welding of tubes and cylinders formed from strip or plate, and in lap welding of flanged connections and the like. Closed or partially closed vessels, heat exchanger shells, tube sheets, header sheets, water box covers, salt water lines, many types of apparatus used on ships particularly in contact with sea water, and various other articles may be fabricated by welding in accordance with the invention of parts made of magnesium-bearing cupro-nickel alloys.

I claim:

1. The improvement in welding parts made of a copper-nickel base alloy containing 10 to 35% nickel and the balance principally copper which comprises including in the copper-nickel base alloy of each of the parts to be welded from 0.02 to 0.1% magnesium, and heating said parts approximate the zone of the contemplated weld to the welding temperature in the absence of any flux and in the presence of a filler made of a copper-nickel base alloy containing 0.02 to 0.1% magnesium.

2. The improvement in welding parts made of copper-nickel base alloys containing 10 to 35% nickel and the balance principally copper which comprises including in the copper-nickel base alloy of each of the parts to be welded from 0.02 to 0.1% magnesium, and heating said parts approximate the zone of the contemplated weld to the welding temperature in the absence of any flux and in the presence of a filler made of a copper-nickel base alloy of substantially the same composition as the alloy of the parts being welded and similarly containing from 0.02 to 0.1% magnesium.

3. The improvement in welding parts made of cupro-nickel alloys which comprises fabricating the parts to be welded of the same copper-nickel base alloy containing 10 to 35% nickel, 0.02 to 0.1% magnesium and the balance principally copper, and heating said parts in welding position approximate the zone of the contemplated weld to the welding temperature in the absence of any flux and in the presence of a filler made of a copper-nickel base alloy of substantially the same composition as that of which said parts are fabricated.

CHARLES H. DAVIS.

REFERENCES CITED

The following references are of record in the file of this patent:

UNITED STATES PATENTS

| Number | Name | Date |
|---|---|---|
| 1,626,691 | Pilling | May 3, 1927 |
| 2,012,450 | Hook | Aug. 27, 1935 |
| 2,074,604 | Bolton et al. | Mar. 23, 1937 |
| 2,091,305 | Butterbaugh | Aug. 31, 1937 |

OTHER REFERENCES

Metals, vol. LL, p. 1392; Carpenter & Robertson, 1939; Oxford Univ. Press, London, England.

"Welding Procedures," pp. 38 and 39, Copyright 1941 by Air Reduction Sales Co. N. Y. C.

Welding Journal, vol. 16, Mar. 1937, Welding Research Suppl., p. 442-s.

Metals Handbook, 1936 Ed. published by the Amer'n Soc. for Metals, Cleveland, Ohio, p. 896.

Certificate of Correction

January 11, 1949.

Patent No. 2,458,688.

CHARLES H. DAVIS

It is hereby certified that errors appear in the printed specification of the above numbered patent requiring correction as follows:

Column 3, line 54, for the word "filled" read *filler*; column 4, line 67, list of references cited, for "vol. LL" read *vol. II*; line 72, for "p. 442-s" read *p. 35*; line 73, before "Metals" insert the following:

*Welding Journal*, vol. 19, No. 11, 1940, Welding Research Suppl., p. *442-s*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*